(12) United States Patent
Kvasyuk et al.

(10) Patent No.: US 11,044,168 B2
(45) Date of Patent: Jun. 22, 2021

(54) FINGERPRINTING APPLICATION TRAFFIC IN A NETWORK

(71) Applicant: Cisco Technology, Inc., San Jose, CA (US)

(72) Inventors: Andrey Kvasyuk, Amherst, MA (US); Hazim Hashim Dahir, Raleigh, NC (US); Robert Bukofser, Mason, NH (US); Saad Syed Hasan, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 47 days.

(21) Appl. No.: 16/459,962

(22) Filed: Jul. 2, 2019

(65) Prior Publication Data

US 2021/0006471 A1 Jan. 7, 2021

(51) Int. Cl.
*H04L 12/24* (2006.01)
*H04L 12/26* (2006.01)
*H04L 12/851* (2013.01)
*H04L 12/801* (2013.01)

(52) U.S. Cl.
CPC ............ *H04L 41/142* (2013.01); *H04L 41/12* (2013.01); *H04L 43/062* (2013.01); *H04L 47/127* (2013.01); *H04L 47/2483* (2013.01)

(58) Field of Classification Search
CPC ..... H04L 41/142; H04L 41/12; H04L 43/062; H04L 47/127; H04L 47/2483
USPC ........................................................ 709/224
See application file for complete search history.

(56) References Cited

U.S. PATENT DOCUMENTS

| 8,839,388 | B2 | 9/2014 | Raleigh |
| 9,473,570 | B2 | 10/2016 | Bhanujan et al. |
| 9,608,840 | B2 | 3/2017 | Ravi et al. |
| 9,686,127 | B2 | 6/2017 | Ramachandran et al. |
| 9,787,581 | B2 | 10/2017 | Dosovitsky |
| 10,033,649 | B2 | 7/2018 | Eggleston et al. |
| 2013/0204997 | A1* | 8/2013 | Eggleston ........... H04L 43/0882 709/223 |

(Continued)

FOREIGN PATENT DOCUMENTS

CN 102724078 A 10/2012

OTHER PUBLICATIONS

Huang, et al., "Early Identifying Application Traffic with Application Characteristics", 2008 IEEE International Conference on Communications, May 2008, 5788-5792, IEEE.

*Primary Examiner* — Nicholas R Taylor
*Assistant Examiner* — Chong G Kim
(74) *Attorney, Agent, or Firm* — Behmke Innovation Group LLC; Kenneth J. Heywood; Jonathon P. Western

(57) ABSTRACT

In one embodiment, a device obtains telemetry data regarding a plurality of traffic flows in a network. The device forms a directed graph based on the telemetry data, wherein nodes of the graph represent devices in the network. The device simulates traffic for one or more of the devices by performing random walks starting at a particular node on the directed graph to generate a set of trails, each trail representing a sequence of one or more flows. The device clusters the set of trails to form one or more clusters. The device generates an application fingerprint for an application based on one of the one or more clusters. The device uses the application fingerprint to identify traffic in the network as associated with the application.

20 Claims, 17 Drawing Sheets

(56) References Cited

U.S. PATENT DOCUMENTS

| | | | |
|---|---|---|---|
| 2016/0020964 A1* | 1/2016 | Eggleston | H04L 43/062 709/224 |
| 2016/0112502 A1 | 4/2016 | Clarke et al. | |
| 2016/0352765 A1* | 12/2016 | Mermoud | H04L 63/1458 |
| 2016/0359912 A1 | 12/2016 | Gupta et al. | |
| 2017/0134404 A1* | 5/2017 | Machlica | G06F 21/00 |
| 2017/0230388 A1* | 8/2017 | Pevny | H04L 63/1433 |
| 2017/0366425 A1* | 12/2017 | Latapie | H04L 67/2804 |
| 2018/0062950 A1* | 3/2018 | Baldi | H04L 67/02 |
| 2019/0260663 A1* | 8/2019 | Pueblas | H04L 63/1408 |

\* cited by examiner

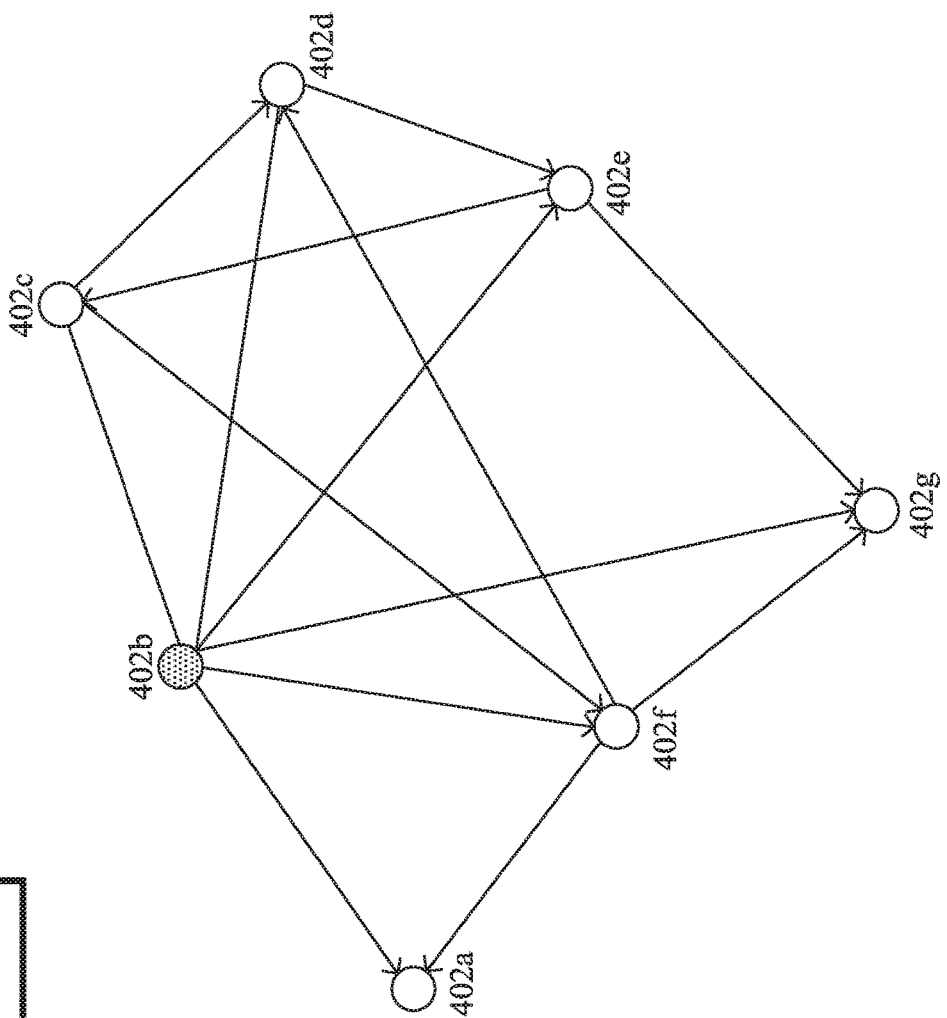
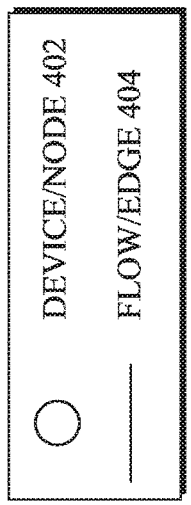
FIG. 4

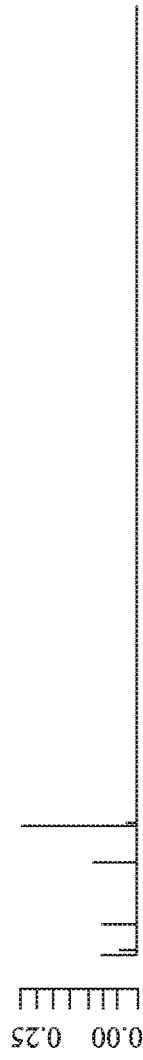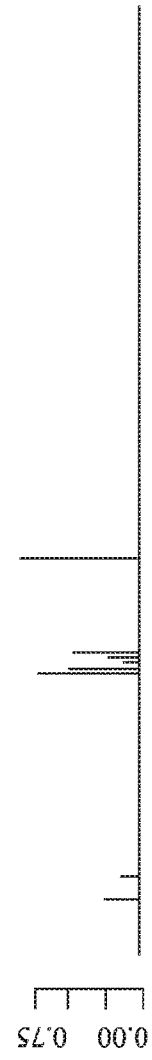
FIG. 7

FINGERPRINTING APPLICATION TRAFFIC IN A NETWORK

TECHNICAL FIELD

The present disclosure relates generally to computer networks, and, more particularly, to fingerprinting application traffic in a network.

BACKGROUND

Networks are large-scale distributed systems governed by complex dynamics and a very large number of parameters. As networks continue to evolve, so too will the number of applications present in a given network, as well as the number of metrics available from the network. With this ever-increasing complexity, identification of the application underlying network traffic can be useful for purposes of security, optimization, migration, upgrading, etc. For example, identifying traffic in the network as sourced by a video conferencing application can aid in ensuring that the network meets the performance requirements of the application in terms of delays, drops, jitter, and the like.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example directed graph;

FIG. 7 illustrates an example application fingerprint;

DESCRIPTION OF EXAMPLE EMBODIMENTS

Overview

Figure 1A:
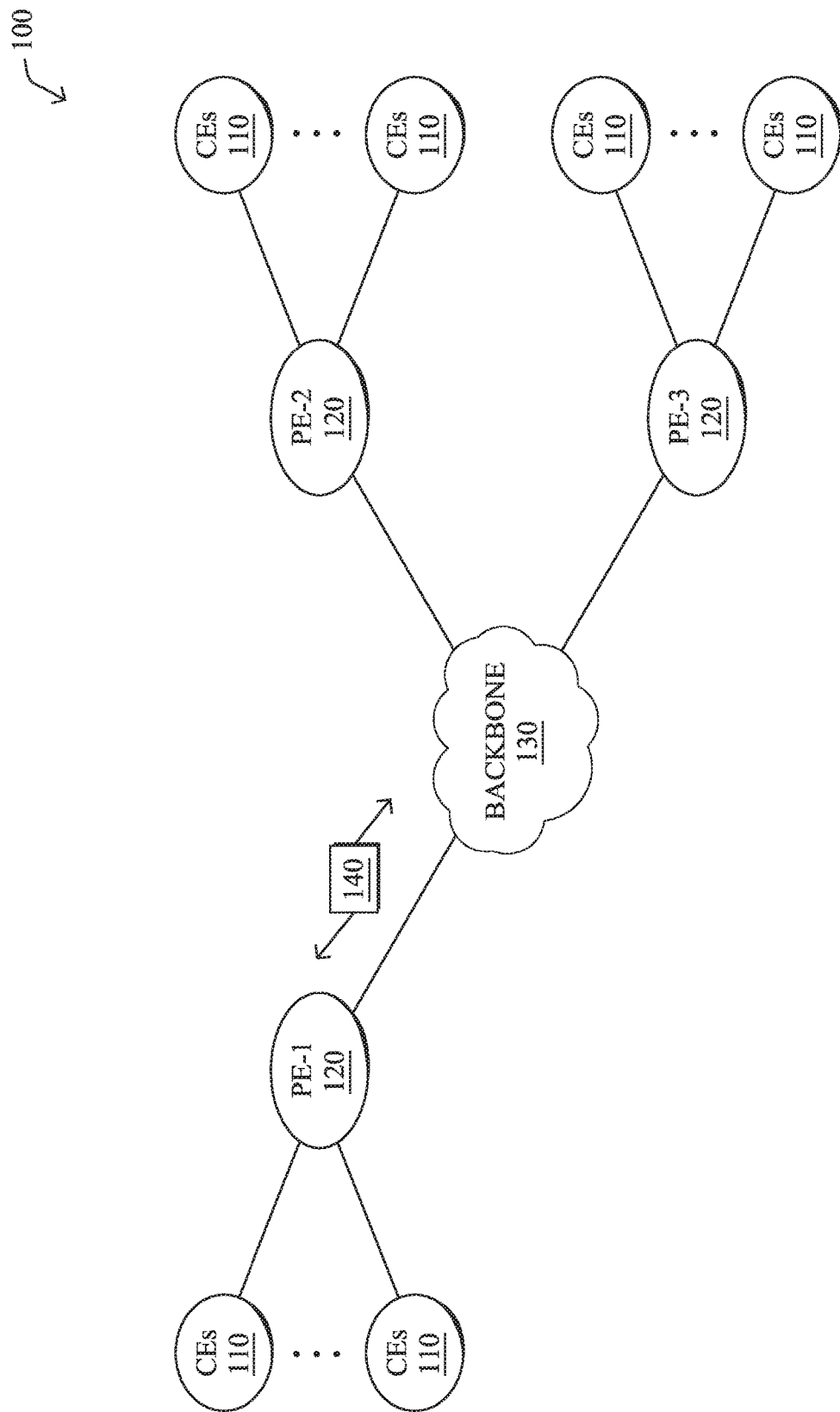
FIGS. 1A-1B illustrate an example communication network.

According to one or more embodiments of the disclosure, a device obtains telemetry data regarding a plurality of traffic flows in a network. The device forms a directed graph based on the telemetry data, wherein nodes of the graph represent devices in the network. The device simulates traffic for one or more of the devices by performing random walks starting at a particular node on the directed graph to generate a set of trails, each trail representing a sequence of one or more flows. The device clusters the set of trails to form one or more clusters. The device generates an application fingerprint for an application based on one of the one or more clusters. The device uses the application fingerprint to identify traffic in the network as associated with the application.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
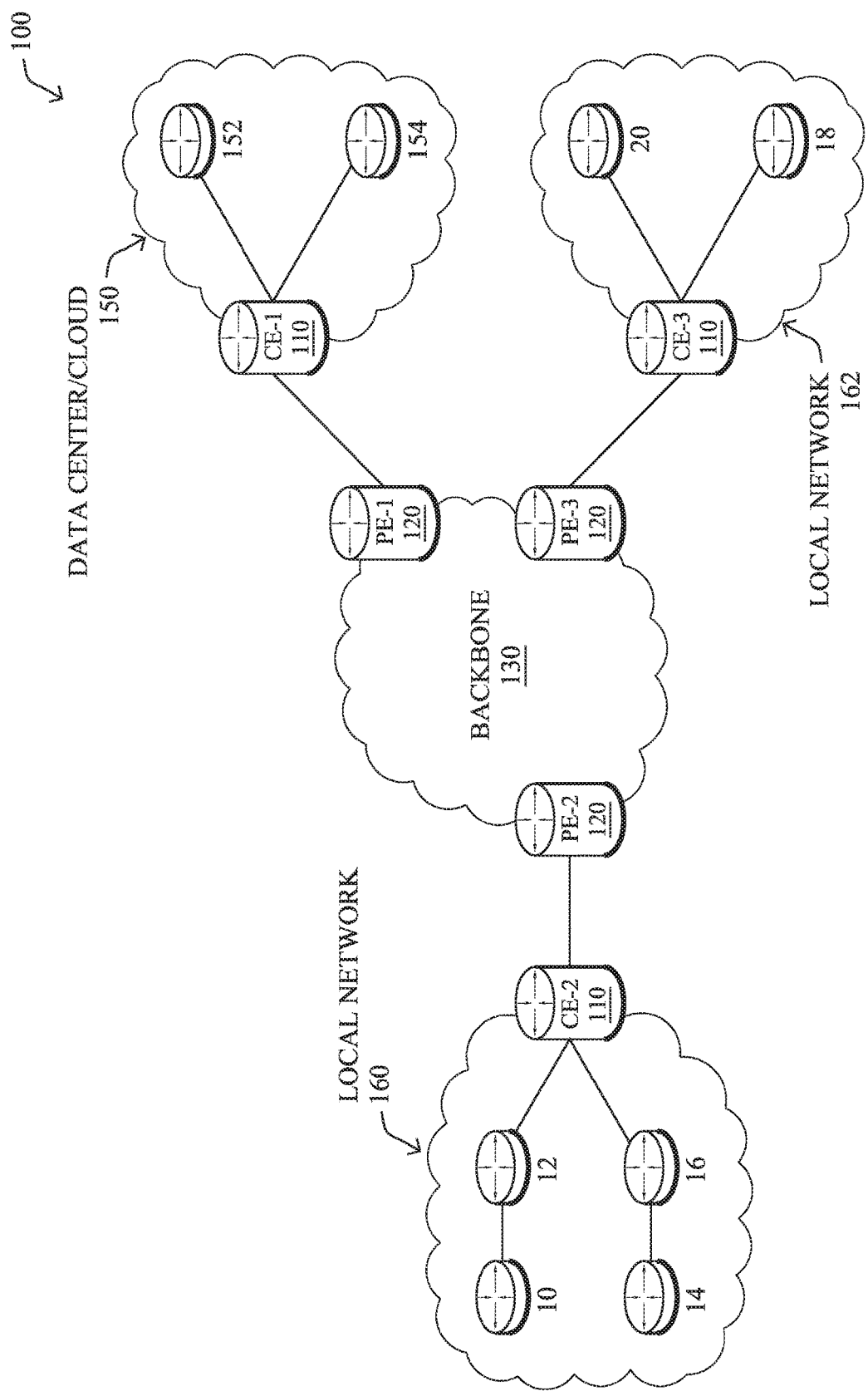

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/ nodes 10-16 and devices/nodes 18-20, respectively, as well as a data center/cloud environment 150 that includes servers 152-154. Notably, local networks 160-162 and data center/ cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
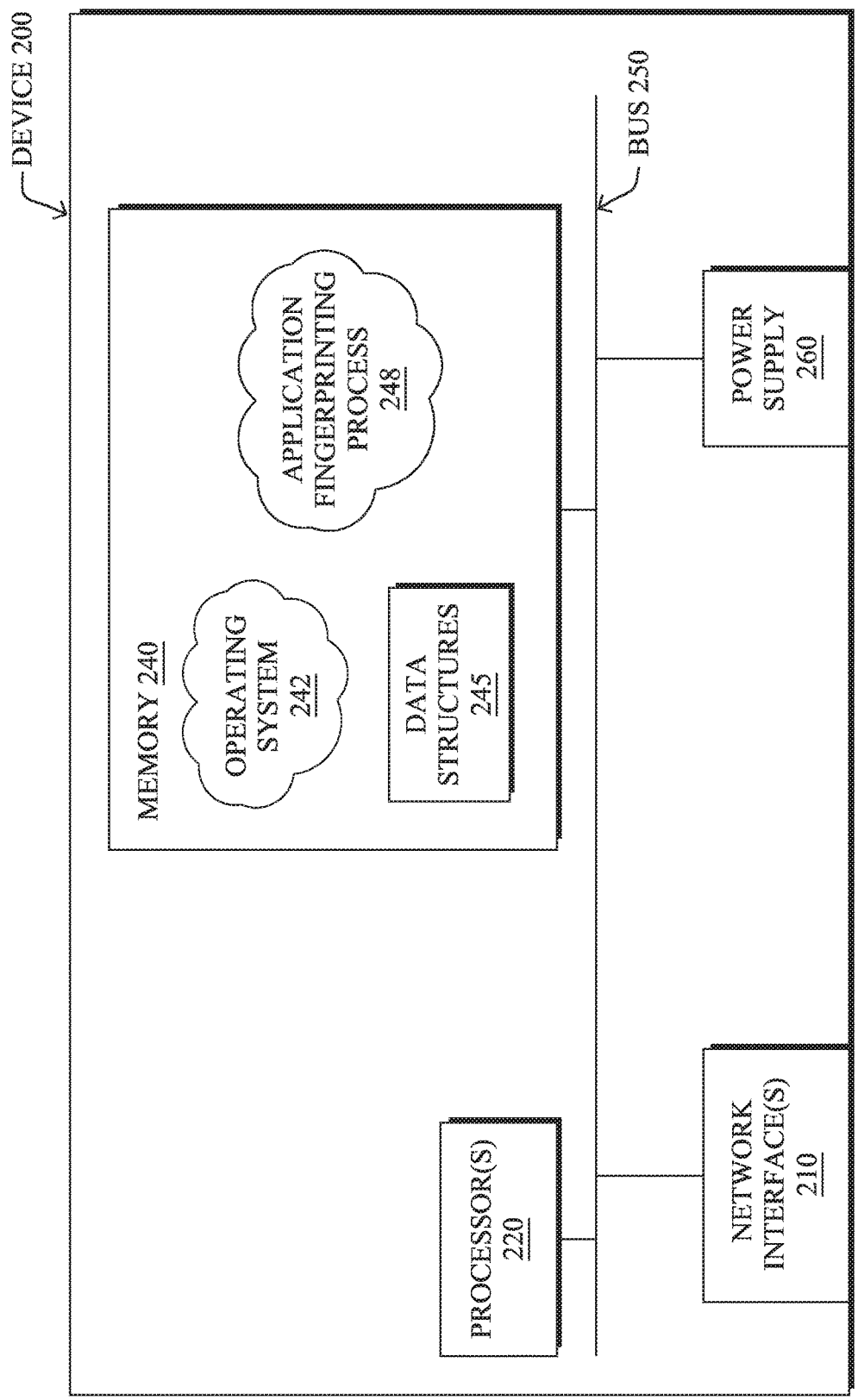
FIG. 2 illustrates an example network device/node.

FIG. 2 is a schematic block diagram of an example node/device 200 (i.e., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application fingerprinting process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application fingerprinting process 248 may be configured to generate a fingerprint/pattern for the traffic of an application in a network, to help identify and analyze the behavior of that application. To do so, in various embodiments, application fingerprinting process 248 may employ any number of machine learning techniques. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, application fingerprinting process 248 can use the model M to classify new data points, such as information regarding new traffic flows in the network. Often, M is a statistical model, and the cost function is inversely proportional to the likelihood of M, given the input data.

In various embodiments, application fingerprinting process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data for traffic that has been labeled with the application associated with the traffic. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that application fingerprinting process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

In some cases, application fingerprinting process 248 may assess the captured telemetry data on a per-flow basis. In other embodiments, application fingerprinting process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
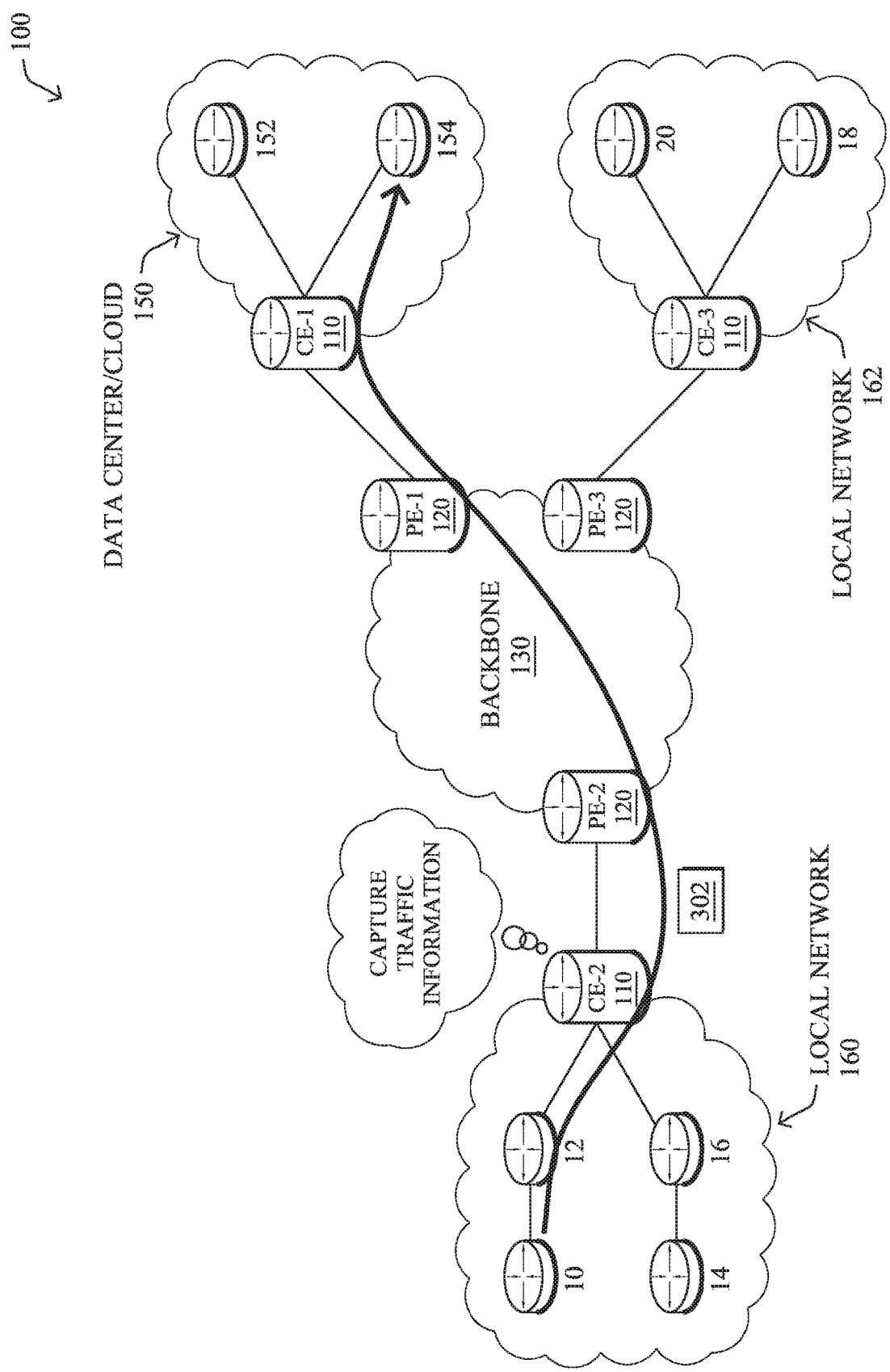
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, identifying the application driving traffic in a network is useful for purposes of security, optimization, migration, upgrading, and the like. Unfortunately, existing application discovery tools are costly and require manual discovery and human intervention to operate. In addition, these tools also typically ignore the intermediate nodes, network or otherwise, facilitating the interaction are not considered during the discovery, evaluation, or assessment. Another problem seen in traditional tools is the lack of the ability to classify traffic and identification of origins of an arbitrary sequence of observed or collected set of flows.

Fingerprinting Application Traffic in a Network

The techniques herein utilize multiple, parallel models and algorithms, to create insights related to applications and components, with zero knowledge of the environment. This allows for the identification of all application candidates, nodes, components, their relationships, and interactions.

Specifically, a device obtains telemetry data regarding a plurality of traffic flows in a network. The device forms a directed graph based on the telemetry data, wherein nodes of the graph represent devices in the network. The device simulates traffic for one or more of the devices by performing random walks starting at a particular node on the directed graph to generate a set of trails, each trail representing a sequence of one or more flows. The device clusters the set of trails to form one or more clusters. The device generates an application fingerprint for an application based on one of the one or more clusters. The device uses the application fingerprint to identify traffic in the network as associated with the application.

Illustratively, the techniques described herein may be performed by hardware, software, and/or firmware, such as in accordance with the application fingerprinting process 248, which may include computer executable instructions executed by the processor 220 (or independent processor of interfaces 210) to perform functions relating to the techniques described herein.

Operationally, it is first important to first consider what constitutes an application. Classically, an application has been viewed in the context of a multi-tier view of the network (e.g., server, application, database) or as associated with a particular port (e.g., port 80, 53, 389, etc.). In contrast, the techniques herein instead take into consideration the following:
- The interface or interaction between the end use and the data-of-interest
- The automated process seen as multiple tasks
- A combination of multiple tasks or functions executed or originated by end users during a time period (e.g. a business day or business week)
- A finite number of tasks executed during that time period
- Similar tasks performed by different end-users generate or produce similar traffic patterns Fingerprinting/modeling the application thus allows the system to:
- Identify the business functions that generated the observed traffic patterns
- Determine the relationship between the business function and the network traffic (e.g., components, frequency of patterns, etc.)
- Generate a visualization of the application in the network for review by a user
- Identify end user execution patterns of business functions Referring again to FIG. 2, application fingerprinting process 248 may fingerprint an application through the following two phases: 1.) extract the structure and order from telemetry data regarding a plurality of traffic flows in a network, and 2.) discovering application candidates through identification of common patterns of network traffic that reflect business functions or processes common to a group of end users.

As would be appreciated, typical telemetry data sets from a network may have millions and millions of flows with thousands of ports. Thus, a decision may be made to control which ports (flows) should be included in the input dataset for application fingerprint process 248, depending on how the application is to be viewed and interpreted. In order to define a typical application, it is first important to remember that the application is a reflection of some business activity that manifests in the form of a network traffic pattern, which is common to the group of users. In other words, different users executing the same functions, from a business standpoint, tend to generate similar network traffic.

In general, a shared service is an application that is consumed by many endpoints/IP addresses. These services are usually used to support networking, filesharing, network monitoring, and the like. Typically, they operate to centralize management of the network and may use well-known ports. While the techniques herein could equally apply to such application traffic, in some embodiments, the system could also filter out this traffic for purposes of application fingerprinting, in further embodiments. Indeed, in some cases, these shared service applications may even skew the results when attempting to identify new or unknown applications in the network. Thus, in various embodiments, application fingerprinting process 248 may either ignore any or all of the following traffic for analysis or the traffic may not be reported to process 248 for further analysis:
- Network service traffic, such as DNS (port 53). For example, traffic that uses ports in the 0-1024 range can be ignored, in some cases, as this range is considered to be the technical or so-called shared layer.
- Traffic involving ephemeral (dynamic or short-lived) ports also typically do not provide valuable information due to their variable nature.
- Traffic involving ports used for monitoring by a special class of application, which can also be considered to be noise and excluded from processing by application fingerprinting process 248.

Of course, any or all of the above traffic types can always be included for analysis by application fingerprinting process 248, as desired. In general, the goal is to see traffic from enough ports in order to cover all possible architectural variations of the applications. At the same time, there should also be enough sparsity in the observed flows, in order to have a clear distinction among the different applications/patterns.

As would be appreciated, the specific set(s) of traffic and ports of interest can be configured at the start, based on the desired model, to control which telemetry data is collected or processed by application fingerprinting process 248. For example, assume that the following are the constraints on the input data:

1. High ports 1024-32767 with exception of ports 5640, 5660, 9010, 10050, 10051, should be included (i.e., exclude dynamic ports and monitoring/replicating traffic)
2. No low ports with exception of ports 80, 443, 389 should also be included (i.e., exclude shared services, but keep some, such as 80, because they are always part of the mid-tier diagrams, for example)

More formally, pseudocode for the above constraints on the traffic is as follows:

attach(df_all_)
df_all=[(((dst_port>1024 & dst_port<32767) & !(dst_port %in% c(5640, 5660, 9010, 10050, 10051)))|
(dst_port %in% c(80, 443, 389)),]
detach(df_all_)

According to various embodiments, application fingerprinting process 248 may form a directed graph of the network, using the obtained telemetry data regarding the traffic flows. More specifically, the graph may have the following properties:

1. Directed—the direction of links between nodes are defined by the flow (e.g., source→destination).
2. Weighted—the weight of an edge may represent the frequency of occurrence of a unique flow (e.g., as represented by its source, destination, and port)
3. Destination Port as an Edge Attribute—the 'name' edge attribute may further represent the destination port of a given flow
4. Graph Nodes Represent Devices—for example, each node in the graph may represent a specific IP address or other device identifier The following pseudocode represents one potential implementation of the functions of application fingerprinting process 248, in one embodiment:

df_all: data frame with flows
MODEL: Full Graph G=graph_from_edgelist(as.matrix (df_all[, c("src_address", "dst_address")]), directed=T)
Full Graph
E(G) $name=df_all$dst_port
E(G)$weight=1 # Initial weight for each link==1
Combine dst_ports and sum-up weights (essentially count them)
G=simplify (G, edge.attr.comb=list(name=function(x) {paste(unique(x), collapse=',')}, weight="sum"))
G=decompose(G)[[1]] # largest piece, no ipv6 (it's usually $1^{st}$, but better to use which.max)

FIG. 4 illustrates an example directed graph 400 that application fingerprinting process 248 may form, based on telemetry data regarding a plurality of observed traffic flows in a network, according to some embodiments. As shown, each node 402 in graph 400 may represent a separate device in the network and may be associated with a device identifier, such as the IP address of the represented device. For purposes of illustration, nodes 402a-402g are shown in graph 400. However, as would be appreciated, a graph representation of a live network may include hundreds, or even thousands, of nodes 402.

Each edge 404 connecting nodes 402 in graph 400 may be associated with a traffic flow between two devices in the network. Accordingly, an edge 404 may be directed, to indicate the direction of the flow (e.g., from its source to its destination). In addition, in some embodiments, each edge 404 may be weighted according to the frequency of occurrence of a unique flow (e.g., same source, destination, and port).

Of interest here is the starting points of applications, which is typically an endpoint client operated by an end user. For example, in the case of a video conference, a user may start a meeting that others then join. Using graph theory, these clients can be represented as follows:

clients=V(G)[degree(G, mode="in")==0]$name #consumers only

Alternatively, clients can also be characterized as nodes 402 with zero incoming connections. For example, as shown, node 402b may be a starting point/client of the application for purposes of analysis by application fingerprinting process 248.

According to various embodiments, application fingerprinting process 248 may use the list of clients as starting points, along with the historical telemetry data for their corresponding flows, to predict where traffic may flow if it originates from a particular client starting point. This is referred to herein as 'forward traffic.' To make these predictions, application fingerprinting process 248 may simulate the traffic by implementing a random walk on the graph, in various embodiments. This random walk will have very special probabilistic properties that application fingerprinting process 248 may calculate using the collected flow telemetry data. In one embodiment, application fingerprinting process 248 may perform random walks on its directed graph for flows as follows:

S0: CurrentNode=Client (Start)
S1: Using graph G identify immediate neighbors of CurrentNode (1st order)
S2: Calculate probabilities of calling the neighbors
S3: Probabilistically select next move (NextNode)
S4: Calculate probabilities of using port for the move
S5: Probabilistically select port
S6: Make a move: (CurrentNode, NextNode, Port)
S7: Current Node=NextNode
S8: Repeat S1-57 until there is no move or number of steps reached the maximum (complete single walk for the Client)
S9: Repeat S8 250-1000 times (Complete Multiple walks for Client)
S10: Repeat S0-S9 for selected (Complete Multiple walks for Multiple Clients)

Figure 6:
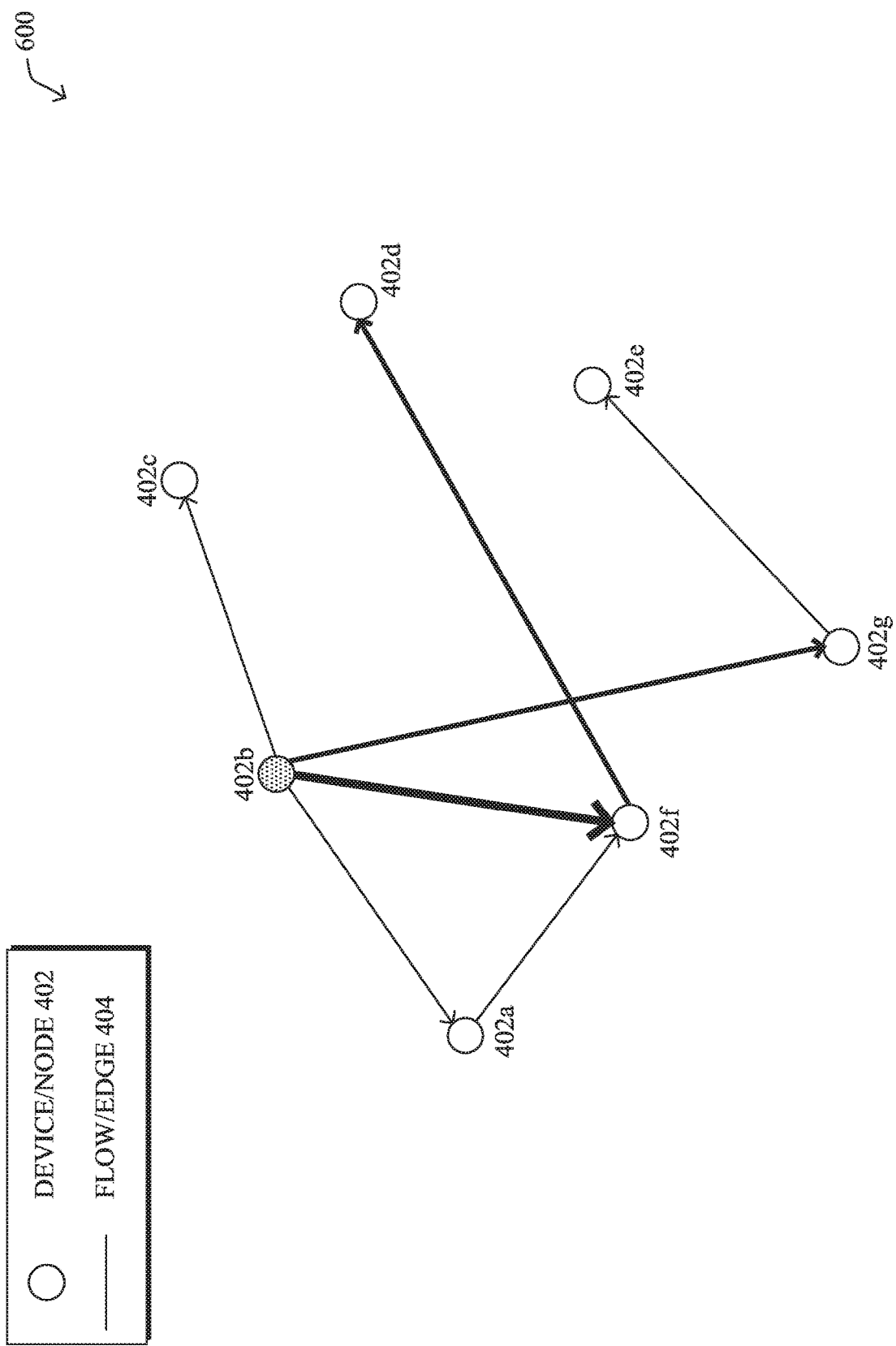
FIG. 6 illustrates an example trail graph.

In some embodiments, application fingerprinting process 248 may use the Dirichlet distribution, to obtain the probabilities of the selection of nodes for the simulated traffic. Alpha-parameters of this distribution are then edge weights of the neighbors as follows:

init_cnt_v=incident(G, s_node, mode="out")$weight # get weights
alpha_n=init_v/length(alpha_c) # alphas as sparsity coeffs
p=rdirichlet(1, alpha_n) # sample probabilities
s=sample(v_ip, 1, prob=p) # sample neighbor FIG. 6 illustrates an example trail graph 600 illustrating such a random walk, according to various embodiments. As shown, application fingerprinting process 248 may use Markov Chain Monte Carlo modeling, or another suitable approach, to simulate traffic from a staring point/node 402 from the previously constructed directed graph (e.g., graph 500). This modeling may entail reconstructing the probabilistic, temporal, and/or spatial properties of the network traffic that are not present in the raw telemetry. More specifically, application fingerprinting process 248 may leverage Markov Chain Monte Carlo modeling to identify:

Where the traffic starts/begins and terminates
What flows form the traffic of a particular user or client
The sequential order of those flows
The frequencies (proportions or probabilities) of those flows At the end of this traffic simulation, application fingerprinting process 248 will have a set of trails for the selected client device under scrutiny. For example, trail 502 shown represents one such trail of flows between the devices/nodes 402 that result from the random walk on the graph.

By way of further example, the following may represent the set of trails for an example client having IP address IP1:
Trail #01 (0.34.15): IP1→P2→IP3 (1:443 2:1521)
Trail #02 (33.05): IP1→IP2→IP4 (1:443 2:443)
Trail #03 (31.40): IP1→IP2 (1:443)
Trail #04 (15.30): IP1→P2→IP5 (1:443 2:5647, 8140, 443)

In some embodiments, once application fingerprinting process 248 has generated a set of trails for a particular client, it may output this information to a user interface in the form of a trail graph. For example, FIG. 6 illustrates an example trail graph 600 that may result from application fingerprinting process 248 simulating traffic starting from node 402b. As shown, the various trails may take the form of sets of edges 404 between nodes 402 and weighted based on their corresponding frequencies. Visualization of a trail graph may allow a network administrator or other interested party to better understand the behavior of the application and the client, without having to perform traditional application discovery.

Referring again to FIG. 2, once application fingerprinting process 248 has generated a set of trails for any number of client devices in the network, the next step in the process entails generating a lexicon/dictionary to represent the different flows of a trail as codes/words. More specifically, the dictionary of application fingerprinting process 248 may represent each source, destination, and port combination (e.g., a unique flow) of a trail as a condensed code. For example. Table 1 below illustrates an example of the code assignments for a number of flows:

TABLE 1

| client | trail_id | SRC | DST | dst_port | term | code |
|---|---|---|---|---|---|---|
| IP1 | IP1_009 | X | IP3 | 8530 | X|IP3|8530 | UJOBBH |
| IP1 | IP1_009 | X | IP3 | 80 | X|IP3|80 | OYKBNK |
| IP1 | IP1_009 | IP3 | IP4 | 443 | IP3|IP4|443 | FSWPVA |
| IP1 | IP1_0010 | X | IP3 | 8531 | X|IP3|8531 | RKRIME |
| IP1 | IP1_0010 | X | IP3 | 8530 | X|IP3|8530 | UJOBBH |
| IP1 | IP1_0010 | X | IP3 | 80 | X|15.15.40.191|80 | OYKBNK |
| IP1 | IP1_0010 | IP3 | IP5 | 443 | IP5|443 | PCFIOU |

As shown in Table 1 above, the IP address of the source device may be represented generically, such as 'X,' 'XXX.XXX.XXX.XXX,' or the like, if the source belongs to clients. In other words, a wildcard can be used in the dictionary to represent any client.

Using the lexicon in its dictionary, application fingerprinting process 248 can thus transform each simulated trail into a sequence of codes/terms. For example, below illustrates example trails represented as sequences of dictionary codes/terms:

```
IP1_0008:   chr "RKRIME UJOBBH OYKBNK
                 GQOAYT"
```

```
IP1_0010:   chr "TNZYNO ASCPVN MMXVHT
                 VZFEDK XYZWPK"
IP2_0001:   chr "GQCYMY HGFHET ZSXCBI"
IP2_0002:   chr "VVILGE FVIOUU ZSXCBI"
IP2_0004:   chr "GQCYMY RGNIJJ"
IP2_0005:   chr "VVILGE SHSLHX"
IP2_0006:   chr "GQCYMY HGFHET"
IP2_0007:   chr "VVILGE FVIOUU"
IP2_0009:   chr "ETZWIP VUXDIQ TYJLJP
                 GJKWAL TCQOKT GLBHSO XAZNGA"
IP2_0010:   chr "ETZWIP VUXDIQ XNVQJJ
                 BKTUFC ONJADB"
IP3_0001:   chr "GQCYMY HGFHET ZSXCBI"
```

Finally, application fingerprinting process 248 may combine the code sequence representations of the trails into a corpus. For example, such a corpus may take the following form:

```
"RKRIME UJOBBH OYKBNK MXIYSV"
"TNZYNO BBFWPF TCQOKT GLBHSO XAZNGA"
"RKRIME OYKBNK DFBURV LRRKJG"
"RKRIME OYKBNK DFBURV"
"RKRIME OYKBNK DFBURV WZYAZG"
"RKRIME OYKBNK GHRAEG"
"RKRIME OYKBNK VEBGPT"

"RKRIME OYKBNK GQOAYT"
"RKRIME OYKBNK MXIYSV"
"RKRIME OYKBNK TVAVNF"
"RKRIME OYKBNK DFBURV XDAXAK"
"RKRIME OYKBNK BPLJWI"
"OYKBNK RKRIME DFBURV LRRKJG"
. . .
```

In order for application fingerprinting process 248 to group the trails (e.g., sequence of codes) based on their similarity, application fingerprinting process 248 may transform the sequences into vectors. In one embodiment, application fingerprinting process 248 may do so by creating a term document matrix based on the observed term frequencies in the corpus. In turn, in various embodiments, application fingerprinting process 248 may perform singular value decomposition (SVD) on the matrix (e.g., by applying latent semantic analysis, etc.). For example, pseudocode for this operation is as follows:

```
Step 1: Create TermDocument Matrix
Matrix tdm is created as TF (Term-Frequencies).
Tdm = TermDocumentMatrix (train_docs,
     control = list(
          #weighting=function(x) {weightTfIdf(x, normalize = TRUE)},
          weighting=function(x) {weightTf(x)},
          tolower=FALSE
     )
)
Step 2: Perform SVD (Singular Value Decomposition) of matrix tdm
Isa_corpus = isa(tdm, dims=50) # Expect TDM format |T| x |D| (Terms are rows
# Get SVD Matrices
tk=Isa_corpus$tk # Terms-Concepts (Left or U)
dk=Isa_corpus$dk # Docs-Concepts (Right or V)
sk= Isa_corpus$sk # Singular Values (diag(sk) or Sigma)
# Preserve trail_ids as rownames of dk
rownames(dk) = trail_ids
rownames(Isa_corpus$dk)=trail_ids
```

In essence, SVD transforms the simulated trails and terms (flows) into vectors in a 'concept space' that can be interpreted as a space of meanings. Tables 2 and 3 below illustrate examples of the tk and dk matrices referenced above:

TABLE 2

| | tk | | | | |
|---|---|---|---|---|---|
| | V1 | V2 | V3 | V4 | ... |
| ASCPVN | −1.46785e−05 | −9.655e−02 | 4.939e−04 | −1.047e−04 | ... |
| AVJHUY | 3.472835e−20 | 0.000e+00 | 0.000e+00 | −3.469e−18 | ... |
| AWQRIS | 5.542838e−19 | −1.604619e−17 | 5.551e−17 | 1.951e−17 | ... |
| AXSEAH | −4.137971e−22 | −3.252e−19 | −2.220e−16 | 1.734e−18 | ... |
| AXUOYY | −6.462349e−27 | 0.000e+00 | 0.000e+00 | 1.734e−18 | ... |
| ... | ... | ... | ... | ... | ... |

TABLE 3

| | dk | | | | |
|---|---|---|---|---|---|
| | V1 | V2 | V3 | V4 | ... |
| IP1__0005 | −1.095418e−07 | −1.484927e−03 | −1.910939e−06 | −6.230112e−04 | ... |
| IP2__0002 | −6.516430e−06 | −1.796499e−03 | 3.078685e−05 | −7.433673e−04 | ... |
| IP3__0001 | −2.169037e−02 | 1.570452e−04 | −3.707577e−02 | −4.4859855e−04 | ... |
| IP4__0004 | −2.612997e−02 | 2.042202e−04 | −1.777926e−02 | −8.334194e−05 | ... |
| IP5__0006 | −1.434350e−02 | 3.216062e−05 | 1.912596e−02 | 3.655094e−02 | ... |
| IP6__0004 | −2.266281e−02 | −2.518780e−05 | 2.345493e−02 | 3.610996e−04 | ... |

In various embodiments, application fingerprinting process 248 may apply clustering to the formed vectors, to group trails together that are similar in terms of their 'meaning.' Here, 'meaning' within the 'space of meanings' is mathematically defined as the direction of the vector representation of the trail. Thus, two trails have the same 'meaning' if their vectors point in the same direction. In other words, if two trail vectors point in the same direction, the angle between them is 0 and cos(0)=1. Conversely, if the two vectors are orthogonal (i.e., have different meanings), the angle between them is 90 and cos(90)=0. Pseudocode to implement this cosine-based measure of similarity with hierarchical clustering is as follows:

```
N_Clusters=50
dist_m=proxy::dist(dk, method="cosine") # it is already
     CONVERTED: cosine to dist=1-cosine
#HCLUST Clustering
hc_tree=hclust(dist_m, method="complete")
hc=cutree(hc_tree, N_Clusters) #<-----Modifiable (Assume the number of Apps)
```

Note that there are multiple ways to estimate the number of clusters. For example, in some cases, N_Clusters can be set manually by an expert, prior to initiating the clustering.

In some embodiments, application fingerprinting process 248 may send a visualization of the clusters to a user interface for review. Note that each cluster may include thousands of simulated trails with similar 'meanings.' Thus, to create the visualization, application fingerprinting process 248 may transform the set of trails in the cluster into a topological, flat view of the traffic. In turn, application fingerprinting process 248 may create the cluster graph by merging together all trails of the cluster, using each step/flow of the trails as an edge, with an initial weight equal to a given base value (e.g., typically 0.1 to 1.0). The edges of the graph can be calculated as: (frequency of flow×base_weight).

Preliminary testing of the techniques herein resulted in a cluster comprising 1521 trails that can be flattened into a structure of just 51 nodes. In addition, there were very strong (frequent) edges and very weak (rare) edges.

In some embodiments, application fingerprinting process 248 may filter out the weak links in a given cluster. This can be achieved, for example, by normalizing the edge weights to a defined range (e.g., 0.5-10.0), computing basic statistics (e.g., mean, median, quantiles) of the edge weights, deciding on a threshold value, and removing edges that have weights less than this threshold. In cases in which application fingerprinting process 248 sends a visualization of a cluster to a user interface, the threshold may be an adjustable parameter, allowing the user to interactively adjust the size of the cluster.

Figure 5:
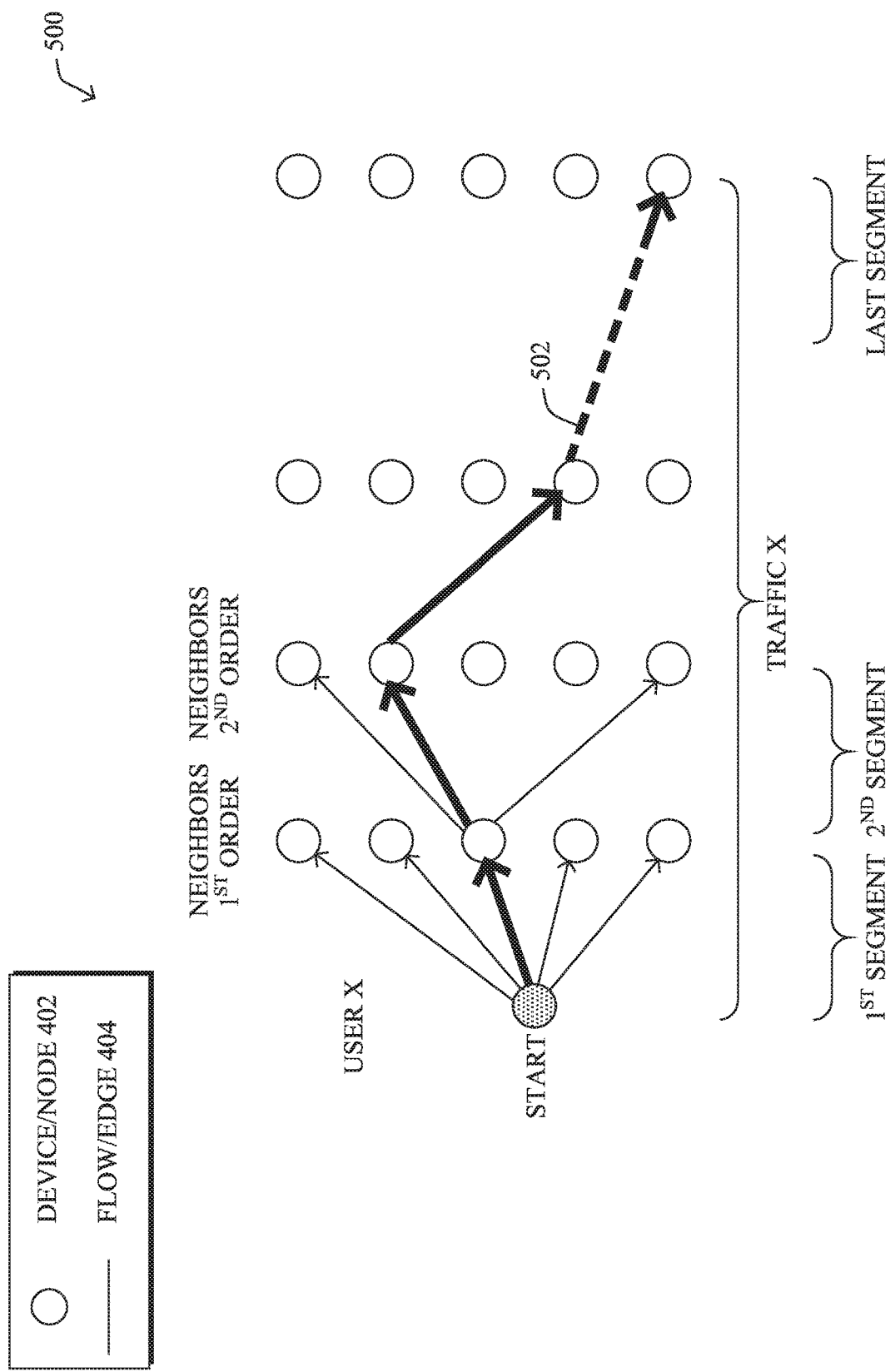
FIG. 5 illustrates an example of simulating traffic in a network.

While visualizing a cluster can be of value, a cluster alone does not answer questions such as "does the traffic in question come from application X?" and "what application is associated with the traffic?" Accordingly, in various embodiments, application fingerprinting process 248 may also generate an application fingerprint (e.g., a model). In general, the first, second, and last segment of the application's traffic are considered the most important, as shown in FIG. 5. Thus, in some embodiments, application fingerprinting process 248 may represent an application fingerprint as a conditional probability distribution over the flows in the first, second, and last segments of a flow: P(TERM|POS).

In some embodiments, application fingerprinting process 248 may also calculate the prevalence of an application. For example, application fingerprinting process 248 may do so by multiplying the number of trails in a cluster by the number of unique clients in the cluster. The idea behind the prevalence is that if trails within the cluster are generated by a lot of clients, then a lot of clients use the application. Once calculated, application fingerprinting process 248 may normalize the prevalence for each cluster, in order to convert this into the probability. Here, the larger the prevalence, the higher the probability of seeing the traffic from the cluster/application. FIG. 7 illustrates an example application fingerprint 700 for a particular cluster, using the above approach.

In some embodiments, application fingerprinting process 248 may also compute a measure of the complexity of a cluster, which reflects the 'busyness' of an application. Here, the idea behind the complexity reflects the variety of flows within the trails of the cluster. For example, application fingerprinting process 248 may treat a cluster as a mixture of flows and compute its complexity as the entropy of the mixture.

In a further embodiment, application fingerprinting process 248 may also identify and eliminate noisy clusters. Note that some clusters may exhibit an extremely high level of prevalence which can be interpreted in one of two ways: 1.) the application is commonly used by a large number of clients or 2.) the cluster does not actually represent an application and is simply noise. Accordingly, application fingerprinting process 248 may leverage a prevalence, complexity, and client-cluster (density) heatmap to identify clusters that represent noise and eliminate them from further consideration.

Once application fingerprinting process 248 has discovered and modeled an application, various use cases are then possible in the network. In some embodiments, application fingerprinting process 248 may use the application fingerprint/model to identify traffic in the network as associated with the application. This can be used, for example, for purposes of network planning, resource allocation, etc.

In a further use case, application fingerprinting process 248 may use its application analysis to identify traffic boundaries of certain endpoints. For example, application fingerprinting process 248 may generate a neighborhood graph for a given endpoint device that defines the boundaries of traffic This can be particularly useful, for example, to identify the potential spread of malware and the span of devices that may need to be protected.

In further embodiments, application fingerprinting process 248 may also assess the past (backwards) traffic in the network. This can be achieved by selecting the staring points for the random walks differently, such as the nodes of the network graph with zero outbound connects. For example, this can be done as follows:

providers=V(G)[degree(G, mode="out")==0]$name

Figure 8A:
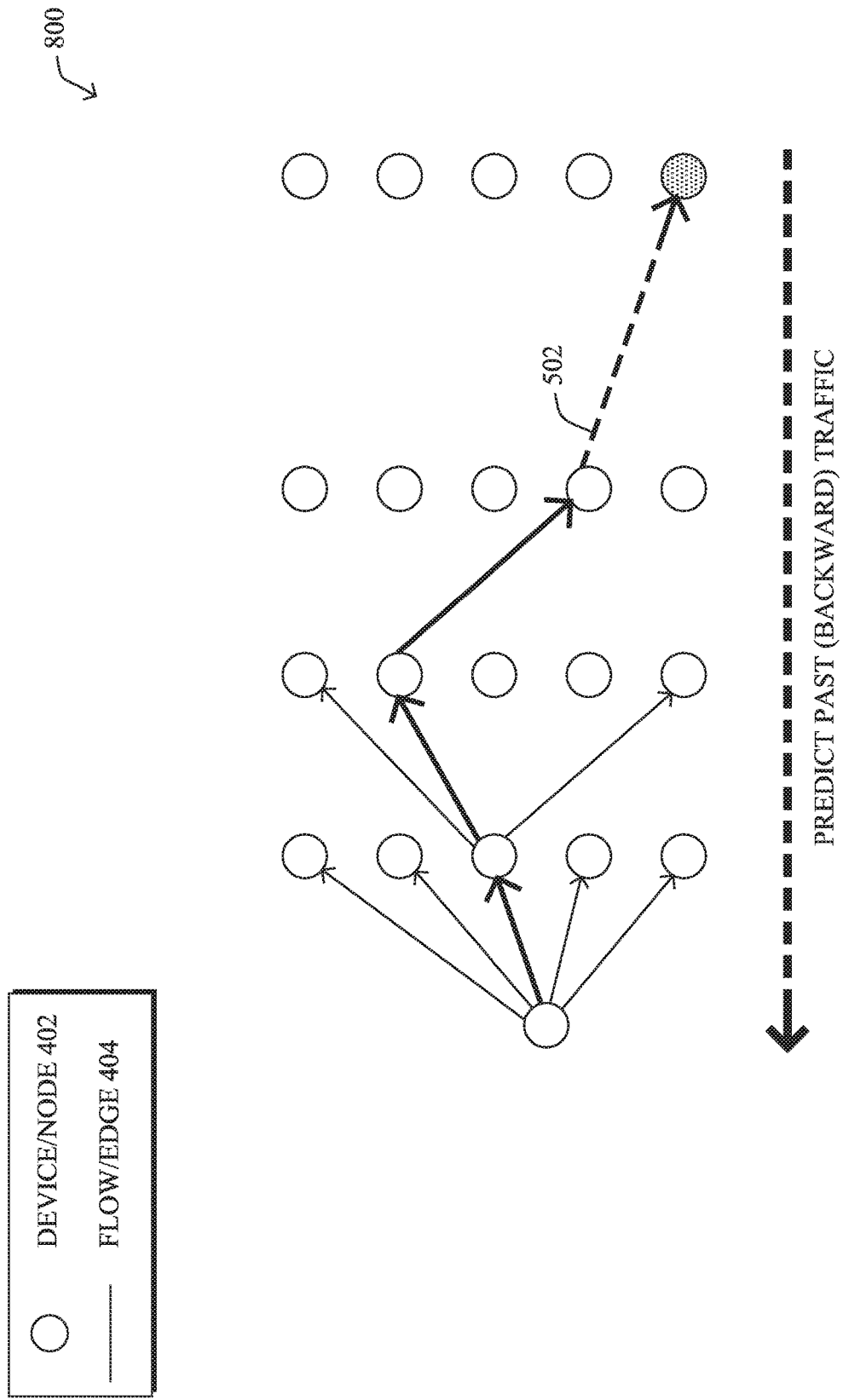
FIGS. 8A-8B illustrate further examples of simulating traffic in a network.
Figure 8B:
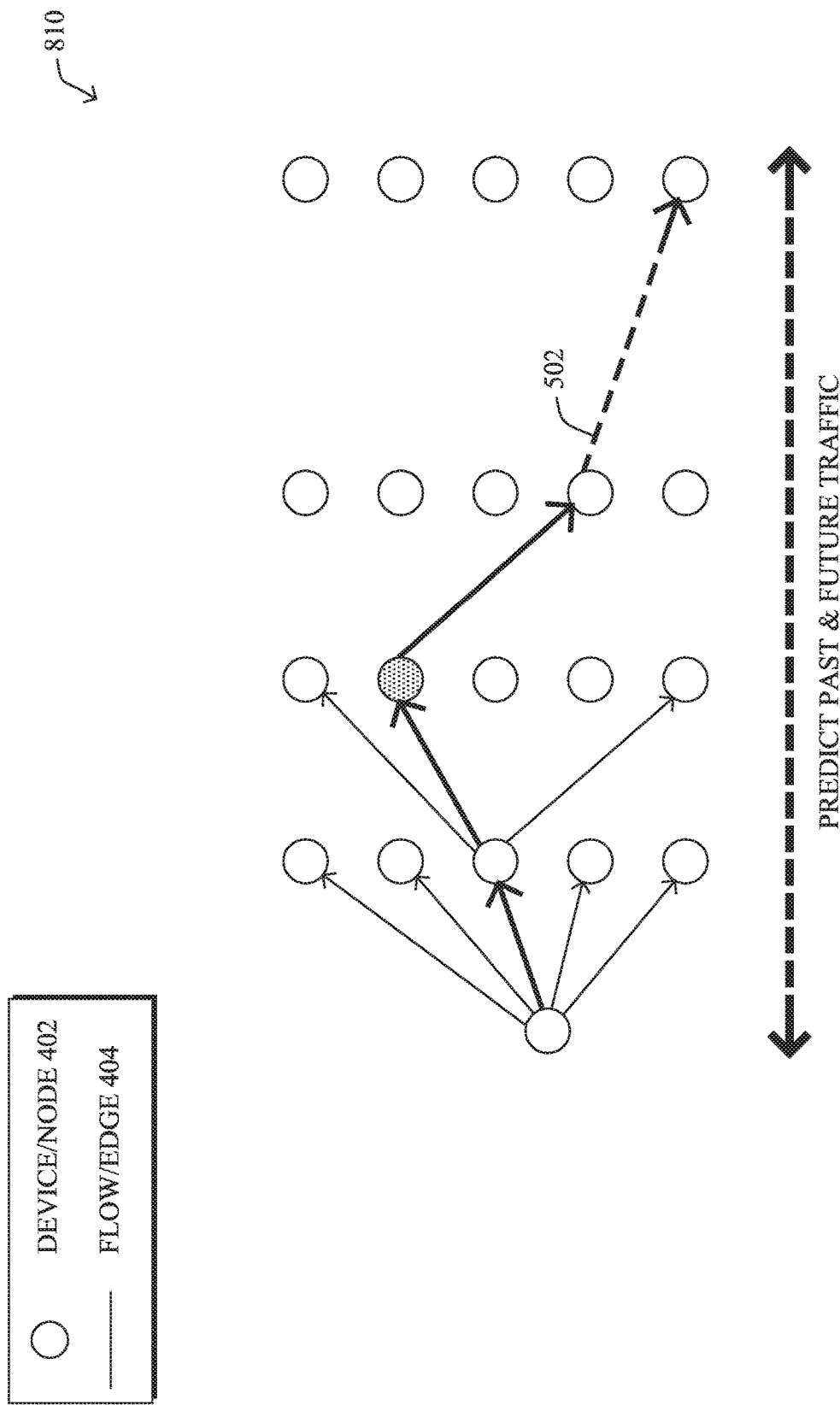

FIGS. 8A-8B illustrate further examples of simulating traffic in a network. As shown in graph 800 in FIG. 8A, application fingerprinting process 248 may select a node 402 that satisfies the above definition as the starting point and walk graph 800 in reverse, to predict past (backwards) traffic for that node. Similarly, in graph 810 in FIG. 8B, application fingerprinting process 248 may select an intermediate node 402 and perform simulations to predict both past and future traffic for that node.

Another potential function of application fingerprinting process 248 may be to learn the "DNA" of the traffic in the network. Similar to DNA in living organisms, traffic in a network may comprise invisible building blocks with distinct characteristics and qualities that can be used to construct the traffic patterns in the network, such as application traffic. Knowing these traffic components helps to 1.) better understand the nature of the traffic in general and 2.) aid in classifying the traffic and subsequently segmenting, securing, and/or visualizing the traffic.

Continuing the biological DNA analogy, flows in a network can be likened to nucleotides that, when combined, form the 'DNA' of the traffic. In turn, the traffic DNA can be combined to form patterns/applications, similar to how DNA sequences can be combined to form chromosomes in an organism.

Figure 9:
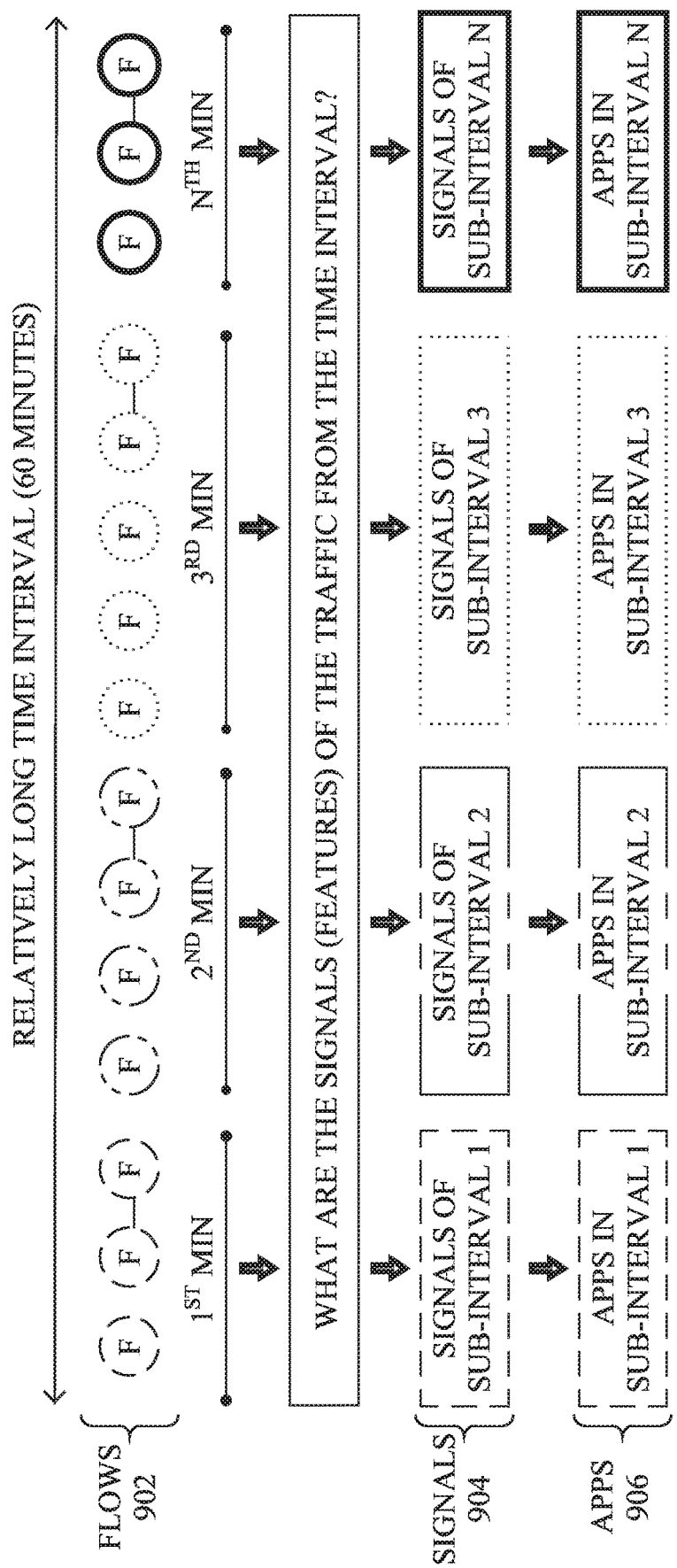
FIG. 9 illustrates an example of the analysis of traffic flows.

To perform this 'DNA' analysis, application fingerprinting process 248 may begin by obtaining flow telemetry data for a specified time interval. In turn, application fingerprinting process 248 may divide this interval into sub intervals and count the frequency of each flow within that sub-interval. FIG. 9 illustrates an example of the analysis of traffic flows using this approach.

As shown in FIG. 9, application fingerprinting process 248 may obtain flow telemetry data over the course of one hour and identify the individual flows 902 observed over this time interval. Then application fingerprinting process 248 may divide this time interval into sub-intervals of one minute each. For each sub-interval, application fingerprinting process 248 may identify the flows 902 that were observed in that sub-interval and detect the signals 904 underlying those flows. This allows application fingerprinting process 248 to then assess how the signals 904 are linked to applications (apps) 906.

More specifically, for the various flows 902, application fingerprinting process 248 may measure the frequency of the flow for each of the time intervals. The results of this can be represented in numerical form as an N×M matrix, where N is the number of flows 902 observed over the time interval and M is the number of sub-intervals. Each entry in the matrix may then indicate the frequency of the flow observed for that sub-interval. In turn, in some embodiments, application fingerprinting process 248 may apply fast independent component analysis (Fast ICA) to the resulting matrix, to obtain the underlying signal information.

Figure 10A:
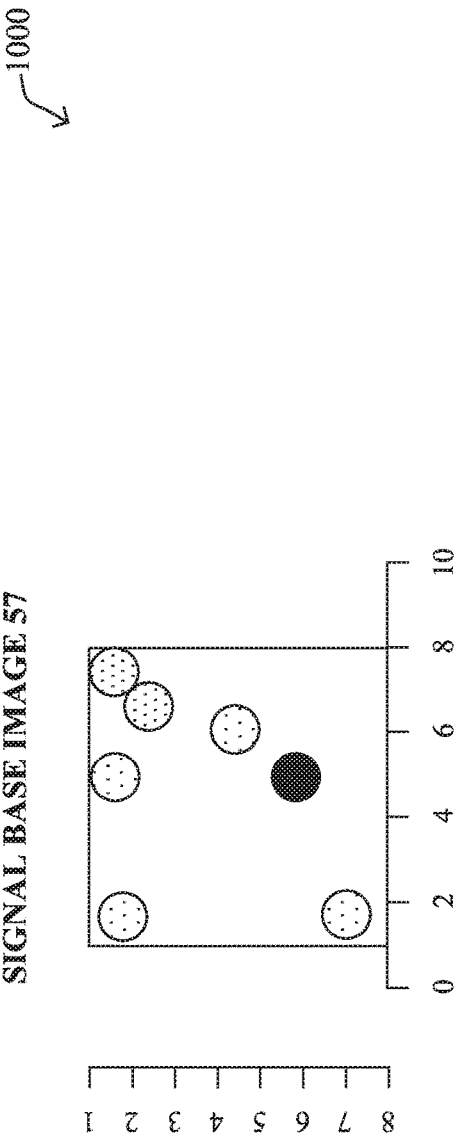
FIGS. 10A-10D illustrate example plots of the analysis of a signal.

In a further embodiment, application fingerprinting process 248 may represent the signal information in the form of images, with the brightness of a pixel representing the frequency of a given flow. For example, FIG. 10A illustrates a signal base image 1000 and the corresponding presence of the signal in the observed sequences is shown in plot 1010 in FIG. 1013. From plot 1010, it can be seen that this signal has a strong presence at approximately 5 minutes, 15 minutes, and 45 minutes into the time interval. This information can be quite useful for a variety of use cases.

Application fingerprinting process 248 may also analyze the structure of an identified signal or for a specific collection of signals, to identify its constituent flows. For example, as shown in plot 1020 in FIG. 10C, the signal shown exhibits 49 strong flows, that application fingerprinting process 248 can flag as 'essential' to the signal. Similarly, plot 1030 in FIG. 10D shows the strong parameters for the signal. Note that application fingerprinting process 248 can also apply the above approaches on a per-sub-interval basis, to identify which signals are strong during that time.

Figure 11A:
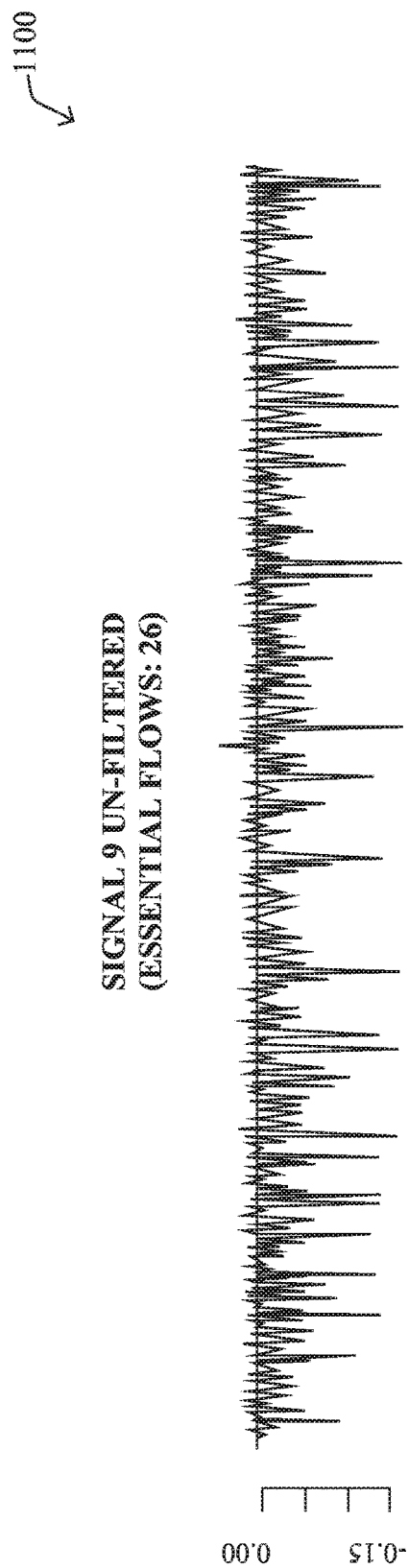
FIGS. 11A-11D illustrate examples of the breakdown of a signal.
Figure 11B:
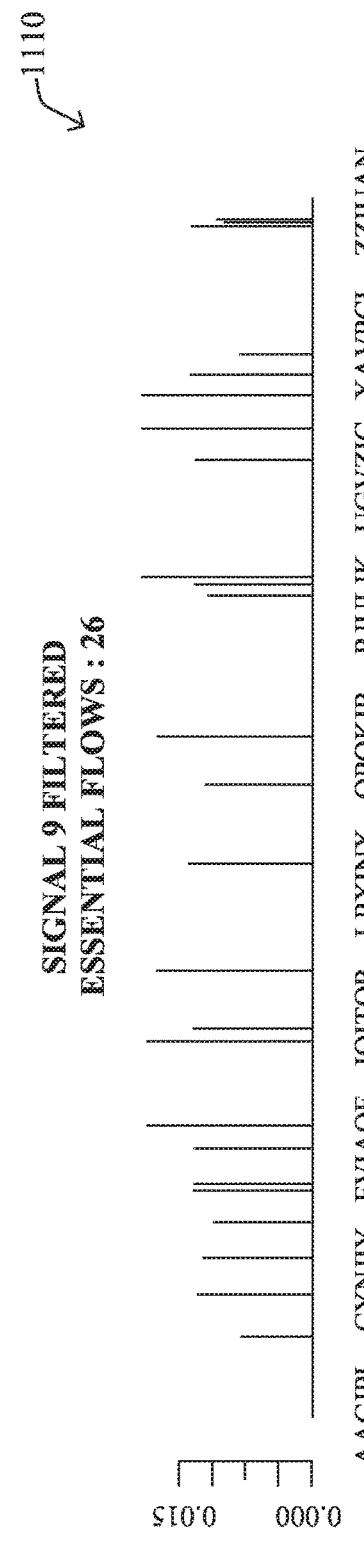

In some embodiments, as noted, application fingerprinting process 248 may discern details about a specific signal. For example, plot 1100 in FIG. 11A shows the constituent flows for a signal in unfiltered form. In this form, there approximately 3500 unique flows that compose the signal. Filtering out for only the strongest flows leads to those show in plot 1110 in FIG. 11B.

Figure 11C:
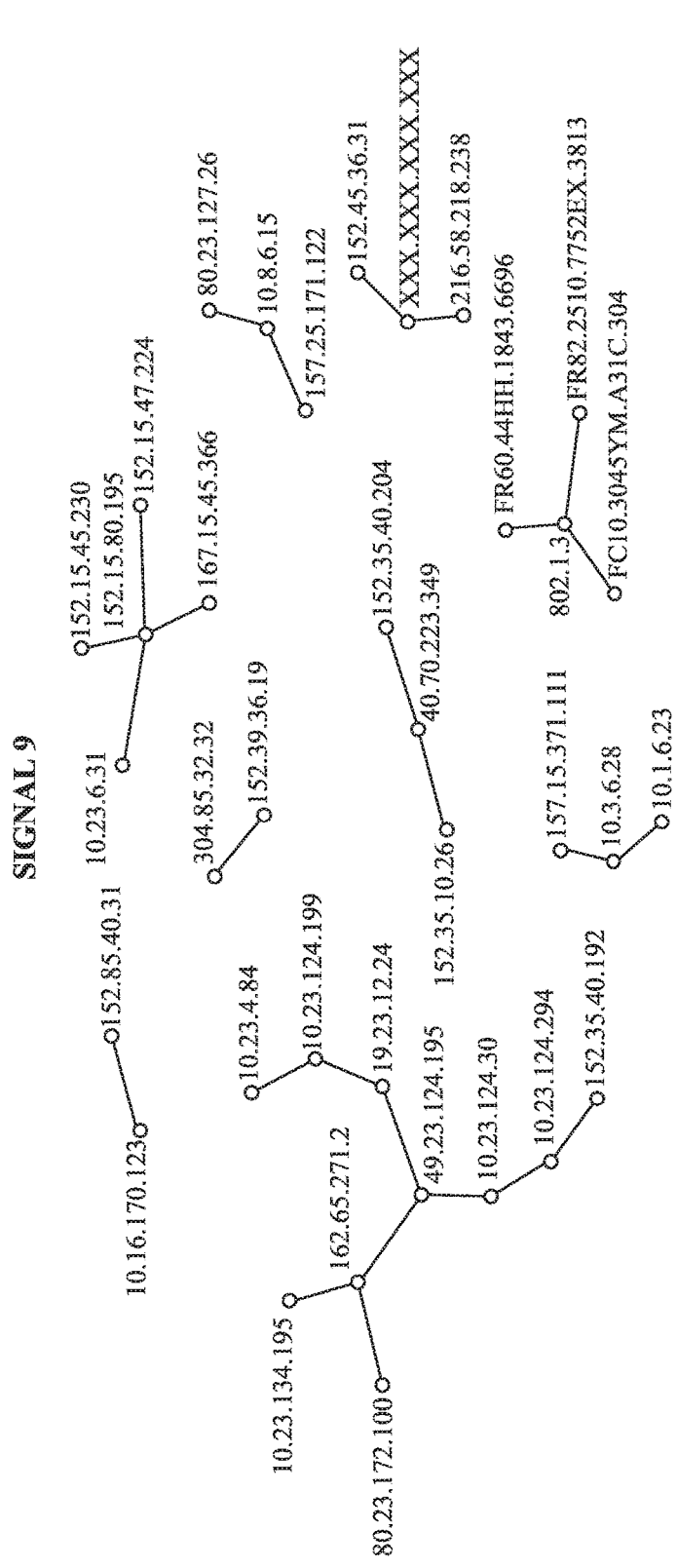

By identifying the constituent flows of a signal, as well as discerning which ones are most strongly present in a given period of time, application fingerprinting process 248 can compare the resulting signal to that of known applications. For example, graph 1120 in FIG. 11C illustrates a visualization of the strongest flows of the signal.

Figure 11D:
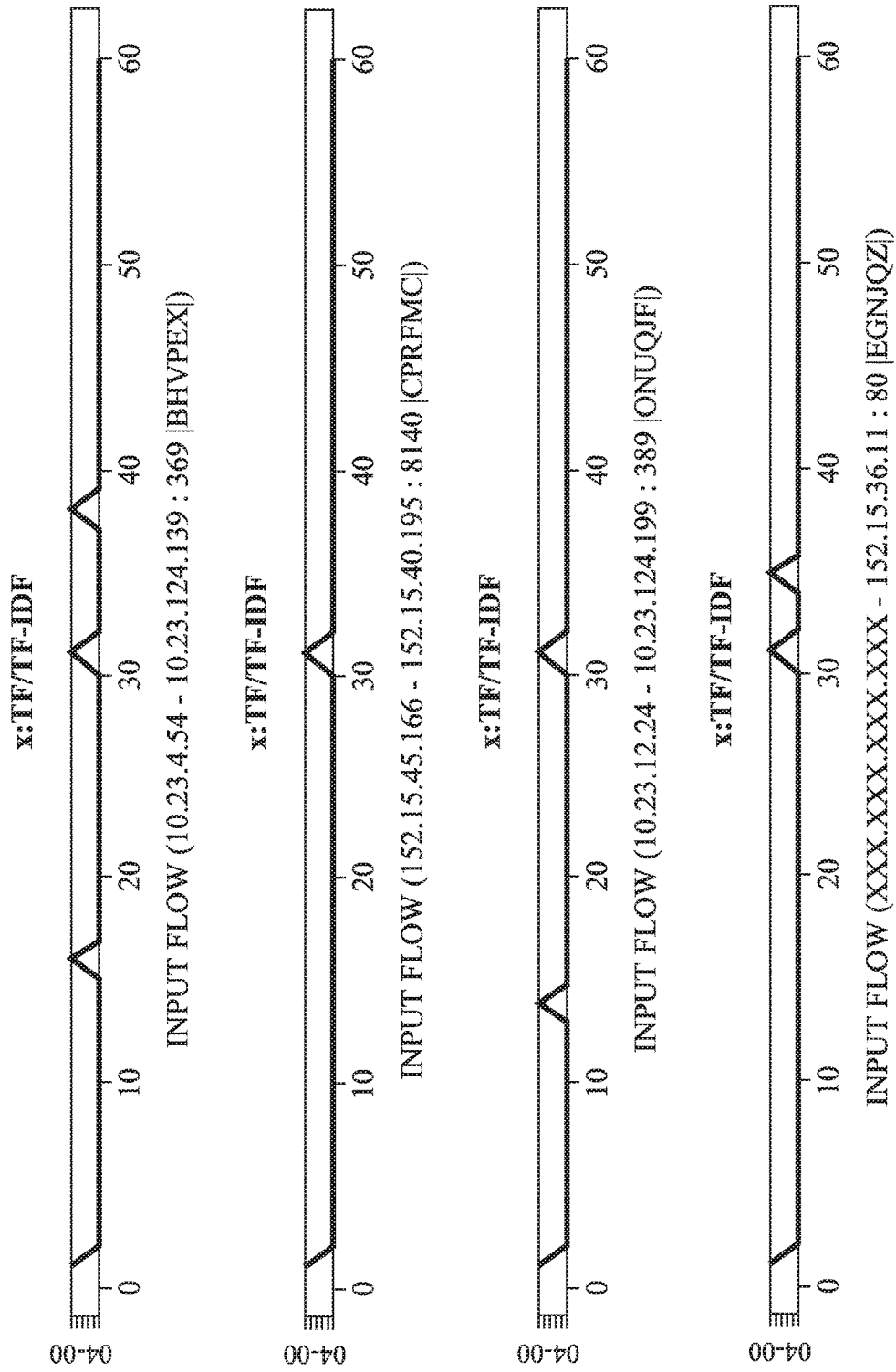

Finally, application fingerprinting process 248 may assess the specific flows of a signal/DNA over time, to determine why it was detected as a strong signal of interest. For example, application fingerprinting process 248 may compute a term frequency-inverse document frequency (TF-IDF) score for each constituent flow of the signal, using their code representations from its dictionary. Plot 1130 in FIG. 11D illustrates a sampling of such an analysis for some of the flows of the signal.

Figure 12:
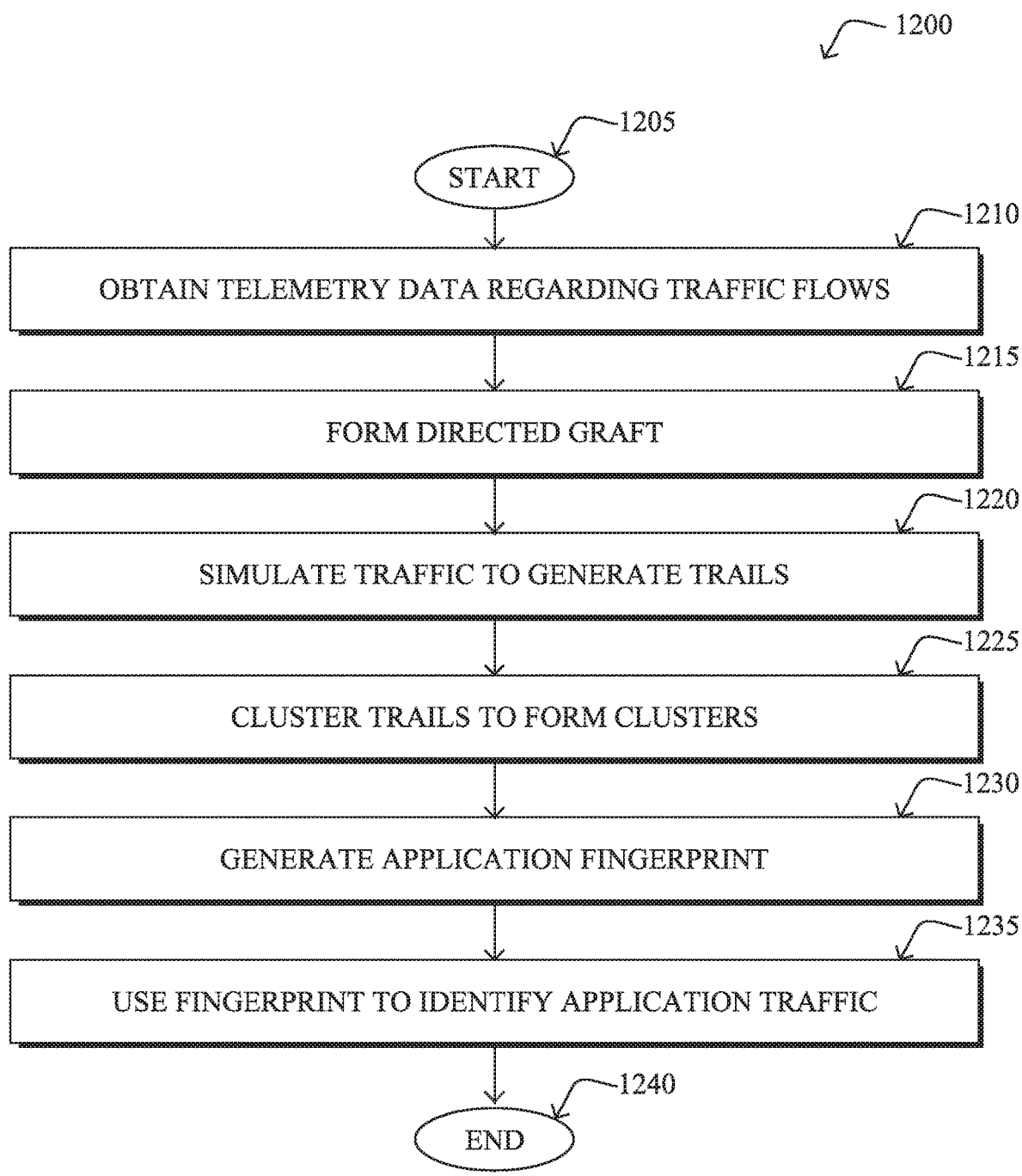
FIG. 12 illustrates an example simplified procedure for fingerprinting an application in a network.

Said differently, application fingerprinting process 248 may perform 'DNA' analysis on a sample of arbitrary flows and compare it with known samples of application DNA, to associate the traffic with the application. In other words, similar to what is done with music or lightwave analysis, application fingerprinting process 248 can deconstruct all collected traffic flows into their building blocks and attempt to glean the following:

Learn traffic spectra of the network: small building blocks
Discover rare or unusual components of this network 'DNA'
Perform network analysis of traffic sources FIG. 12 illustrates an example simplified procedure for fingerprinting an application in a network, in accordance with one or more embodiments described herein. For example, a non-generic, specifically configured device (e.g., device 200) may perform procedure 1200 by executing stored instructions (e.g., process 248), to provide a service to one or more networks. The procedure 1200 may start at step 1205, and continues to step 1210, where, as described in greater detail above, the device may obtain telemetry data regarding a plurality of traffic flows in a network. At a minimum, this telemetry data may typically indicate the source, destination, and port of a flow, as well as timing information regarding the flow (e.g., when it starts, ends, etc.).

At step 1215, as detailed above, the device may form a directed graph based on the telemetry data. In various embodiments, nodes of the graph represent devices in the network. Edges of the graph may similarly represent flows from the telemetry data and may be directed, accordingly. In addition, the edges of the graph may be weighted based on the frequency of occurrence of the flow.

At step 1220, the device may simulate traffic for one or more of the devices by performing random walks on the directed graph to generate a set of trails, as described in greater detail above. In various embodiments, each trail may represent a sequence of one or more flows and starts a flow initiated by a particular one of the devices. To perform the simulation, the device may use a Markov Chain Monte Carlo model to determine a probability of a traffic flow between a current node in the graph and a neighbor node.

At step 1225, as detailed above, the device may cluster the resulting trails into one or more clusters. In some embodiments, the device may do so by transforming the trails into sequences of terms by using a dictionary lexicon to represent each flow in a trail as a code. In turn, the device may convert the codes in each trail into a vector representation and apply clustering to the vector representations of the trails.

At step 1230, the device may generate an application fingerprint for an application based on one of the one or more clusters, as described in greater detail above. This may entail, in some embodiments, computing a conditional probability distribution based on flows associated with that cluster. More specifically, the fingerprint may comprise characteristics of the flows of simulation trails that are similar to one another. This may also entail calculating a prevalence for the cluster by multiplying a number of trails in that cluster by a number of unique client devices associated with that cluster.

At step 1235, as detailed above, the device may use the application fingerprint to identify traffic in the network as associated with the application. For example, the device may compare the fingerprint/model from step 1230 to the flows observed in the network, to determine whether those flows also belong to the application. Procedure 1200 then ends at step 1240.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce traffic analysis techniques that assess the complex network patterns/applications in the network. This analysis can be used for purposes of data center migrations, optimizing network performance, network security, and the like.

While there have been shown and described illustrative embodiments that provide for fingerprinting application traffic in a network, it is to be understood that various other adaptations and modifications may be made within the spirit and scope of the embodiments herein. For example, while certain embodiments are described herein with respect to using certain models for purposes of modeling applications, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a device, telemetry data regarding a plurality of traffic flows in a network;
forming, by the device, a directed graph based on the telemetry data, wherein nodes of the directed graph represent devices in the network;
simulating, by the device and based at least on a probability of a traffic flow between a particular starting node of the directed graph and one or more neighbor nodes, traffic for one or more of the devices by performing random walks on the directed graph starting at the particular starting node to generate a set of trails, each trail representing a sequence of one or more flows from the particular starting node to the one or more neighbor nodes that result from the random walks on the directed graph;
clustering, by device, the set of trails to form one or more clusters;
generating, by the device, an application fingerprint for an application based on one of the one or more clusters; and
using, by the device, the application fingerprint to identify traffic in the network as associated with the application.

2. The method as in claim 1, wherein simulating traffic for one or more of the devices by performing random walks on the directed graph to generate a set of trails comprises:
using a Markov Chain Monte Carlo model to determine the probability of a traffic flow between the particular starting node of and the one or more neighbor nodes.

3. The method as in claim 1, wherein clustering the set of trails to form one or more clusters comprises:
transforming the trails into sequences of terms by using a dictionary lexicon to represent each flow in a trail as a code;
converting the codes in each trail into a vector representation; and
applying clustering to the vector representations of the trails.

4. The method as in claim 3, further comprising:
sending a visualization of the one or more clusters to a user interface.

5. The method as in claim 1, wherein generating the application fingerprint for the application based on one of the one or more cluster comprises:
computing a conditional probability distribution based on flows associated with that cluster.

6. The method as in claim 5, wherein generating the application fingerprint for the application based on one of the one or more cluster comprises:
calculating a prevalence for the cluster by multiplying a number of trails in that cluster by a number of unique client devices associated with that cluster.

7. The method as in claim 1, further comprising:
simulating, by the device, backwards traffic by performing random walks on the directed graph starting from nodes in the graph that represent devices with no outbound connections, to generate a set of backwards trails;
clustering the set of backwards trails into one or more clusters;
using one of the clusters of backwards trails to identify a source device of traffic in the network.

8. The method as in claim 1, further comprising:
measuring a frequency of each flow within a time interval; and
applying fast independent component analysis to the frequencies of the flows within the time interval, to generate an application fingerprint.

9. An apparatus, comprising:
one or more network interfaces to communicate with one or more networks;
a processor coupled to the network interfaces and configured to execute one or more processes; and
a memory configured to store a process executable by the processor, the process when executed configured to:
obtain telemetry data regarding a plurality of traffic flows in a network;
form a directed graph based on the telemetry data, wherein nodes of the directed graph represent devices in the network;
simulate, based at least on a probability of a traffic flow between a particular starting node of the directed graph and one or more neighbor nodes, traffic for one or more of the devices by performing random walks on the directed graph starting at the particular starting node to generate a set of trails, each trail representing a sequence of one or more flows from the particular starting node to the one or more neighbor nodes that result from the random walks on the directed graph;
cluster the set of trails to form one or more clusters;
generate an application fingerprint for an application based on one of the one or more clusters; and
use the application fingerprint to identify traffic in the network as associated with the application.

10. The apparatus as in claim 9, wherein the apparatus simulates traffic for one or more of the devices by performing random walks on the directed graph to generate a set of trails by:
using a Markov Chain Monte Carlo model to determine the probability of a traffic flow between the particular starting node of and the one or more neighbor nodes.

11. The apparatus as in claim 9, wherein the apparatus clusters the set of trails to form one or more clusters by:
transforming the trails into sequences of terms by using a dictionary lexicon to represent each flow in a trail as a code;
converting the codes in each trail into a vector representation; and
applying clustering to the vector representations of the trails.

12. The apparatus as in claim 11, wherein the process when executed is further configured to:
sending a visualization of the one or more clusters to a user interface.

13. The apparatus as in claim 9, wherein the apparatus generates the application fingerprint for the application based on one of the one or more cluster by:
computing a conditional probability distribution based on flows associated with that cluster.

14. The apparatus as in claim 13, wherein the apparatus generates the application fingerprint for the application based on one of the one or more cluster by:

calculating a prevalence for the cluster by multiplying a number of trails in that cluster by a number of unique client devices associated with that cluster.

15. The apparatus as in claim 9, wherein the process when executed is further configured to:
   simulate backwards traffic by performing random walks on the directed graph starting from nodes in the graph that represent devices with no outbound connections, to generate a set of backwards trails;
   cluster the set of backwards trails into one or more clusters;
   use one of the clusters of backwards trails to identify a source device of traffic in the network.

16. The apparatus as in claim 9, wherein the process when executed is further configured to:
   measure a frequency of each flow within a time interval; and
   apply fast independent component analysis to the frequencies of the flows within the time interval, to generate an application fingerprint.

17. A tangible, non-transitory, computer-readable medium storing program instructions that cause a device to execute a process comprising:
   obtaining, by a device, telemetry data regarding a plurality of traffic flows in a network;
   forming, by the device, a directed graph based on the telemetry data, wherein nodes of the directed graph represent devices in the network;
   simulating, by the device and based at least on a probability of a traffic flow between a particular starting node of the directed graph and one or more neighbor nodes, traffic for one or more of the devices by performing random walks on the directed graph starting at the particular starting node to generate a set of trails, each trail representing a sequence of one or more flows from the particular starting node to the one or more neighbor nodes that result from the random walks on the directed graph;
   clustering, by device, the set of trails to form one or more clusters;
   generating, by the device, an application fingerprint for an application based on one of the one or more clusters; and
   using, by the device, the application fingerprint to identify traffic in the network as associated with the application.

18. The computer-readable medium as in claim 17, wherein simulating traffic for one or more of the devices by performing random walks on the directed graph to generate a set of trails comprises:
   using a Markov Chain Monte Carlo model to determine the probability of a traffic flow between the particular starting node of and the one or more neighbor nodes.

19. The computer-readable medium as in claim 17, wherein clustering the set of trails to form one or more clusters comprises:
   transforming the trails into sequences of terms by using a dictionary lexicon to represent each flow in a trail as a code;
   converting the codes in each trail into a vector representation; and
   applying clustering to the vector representations of the trails.

20. The computer-readable medium as in claim 17, wherein generating the application fingerprint for the application based on one of the one or more cluster comprises:
   computing a conditional probability distribution based on flows associated with that cluster.

* * * * *

UNITED STATES PATENT AND TRADEMARK OFFICE
CERTIFICATE OF CORRECTION

PATENT NO. : 11,044,168 B2  
APPLICATION NO. : 16/459962  
DATED : June 22, 2021  
INVENTOR(S) : Kvasyuk et al.

Page 1 of 1

It is certified that error appears in the above-identified patent and that said Letters Patent is hereby corrected as shown below:

In the Specification

Column 10, Line 40, please amend as shown:  
S8: Repeat S1-S7 until there is no move or number of Column 11, Line 13, please amend as shown:  
Trail #01 (34.15) : IP1→ IP2 → IP3 (1:443 2:1521)

Column 11, Line 16, please amend as shown:  
Trail #04 (15.30) : IP1 → IP2 → IP5 (1:443 2:5647, 8140, Column 16, Line 41, please amend as shown:  
time interval. Then, application fingerprinting process 248

Figure 10B:
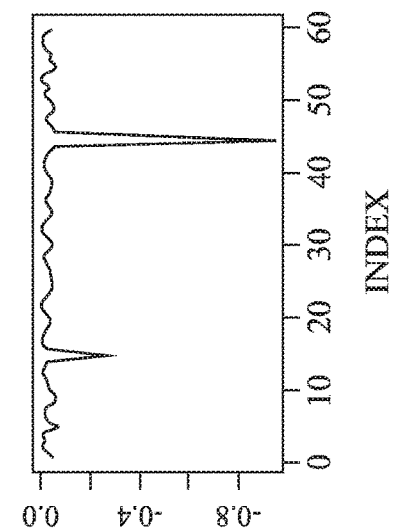
Figure 10C:
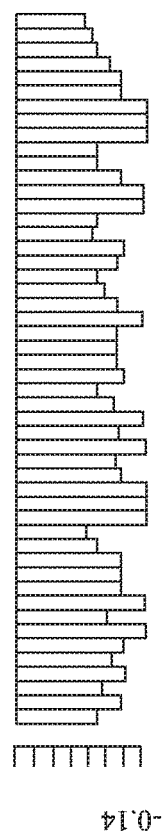
Figure 10D:
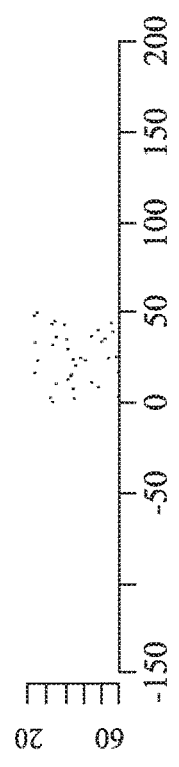

Column 16, Line 66, please amend as shown:  
in FIG. 10B. From plot 1010, it can be seen that this signal Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*